United States Patent [19]

Kuehl

[11] Patent Number: 4,775,045
[45] Date of Patent: Oct. 4, 1988

[54] MULTI-LEVEL CHAIN CONVEYOR WITH LOAD BY-PASS AT SELECTED LEVELS

[75] Inventor: Guenther L. Kuehl, Greenwich, Conn.

[73] Assignee: Z-Loda Corporation, Stamford, Conn.

[21] Appl. No.: 31,898

[22] Filed: Mar. 30, 1987

[51] Int. Cl.[4] ............................................. B65G 17/48
[52] U.S. Cl. ................................................. 198/799
[58] Field of Search .............................. 198/797–802; 414/564, 609, 612, 617, 660

[56] References Cited

U.S. PATENT DOCUMENTS

| | | | |
|---|---|---|---|
| 3,337,069 | 8/1967 | Burger | 414/612 X |
| 3,631,966 | 1/1972 | Katayama | 198/799 |
| 3,684,079 | 8/1972 | Kuehl | 198/799 |
| 3,756,378 | 9/1973 | Kuehl et al. | 198/799 |
| 4,465,177 | 8/1984 | Dorner | 198/799 X |

FOREIGN PATENT DOCUMENTS 1513026 6/1978 United Kingdom ................ 198/799

Primary Examiner—Robert J. Spar
Assistant Examiner—Lyle Kimms

[57] ABSTRACT

A lift conveyor for conveying loads from one level to another comprises a first and second pair of offset endless chains trained over sprockets which guide the chains through their travel in a substantially parallel and spaced-apart relationship. The sprockets are rotatably driven by a motor, and load-carrying connectors connected to the chains define horizontal platforms between levels for carrying the loads and are bendable during their travel over the sprockets. By-pass stations are provided at each floor adjacent the chains which are selectively operable to by-pass any given floor. The by-pass station includes a lift table and a hydraulic device for raising and lowering the lift table. A horizontal roller conveyor on the lift table receives the loads and conveys them to a storage terminal, or when the table is raised in a by-pass mode, serves to re-load the load back onto the lift conveyor for lifting and unloading to another floor.

4 Claims, 3 Drawing Sheets

MULTI-LEVEL CHAIN CONVEYOR WITH LOAD BY-PASS AT SELECTED LEVELS

FIELD OF THE INVENTION

The present invention relates to multi-level chain conveyors and is particularly related to such conveyor systems for lifting loads from one station to another station. More particularly, this invention relates to a multi-level chain conveyors for loading and unloading at different vertical stations, with preselected load by-pass capabilities at different or preselected levels.

BACKGROUND OF THE INVENTION

Vertical lifts and conveyors are commonly used to move various loads from one level to another, usually higher level. Various types of such lifts and conveyors have been used in the past and are described in several patents and publications. For example, U.S. Pat. No. 1,736,011 describes an automatic unloading elevator adapted to unload at different levels. In another patent, i.e., U.S. Pat. No. 3,024,891, the patentee describes a continuous vertical lift having endless flexible chains carrying horizontal platforms. The platforms are rigid in their horizontal carrying positions but bend during their return to a loading position and hence occupy a minimum of space. More recently, U.S. Pat. No. 4,465,177 which issued to Wolfgang C. Dorner on Aug. 14, 1984 describes an elevator for a conveyor system which receives a load from the conveyor and delivers it to a second conveyor at a different level.

Other patents which are representative of the different types of conveyors heretofore used include U.S. Pat. Nos. 1,057,934; 1,829,317; 1,856,262; 2,931,524; 3,184,039; 3,557,940; 3,593,862; 3,631,963; 3,735,853; 4,039,070 and 4,130,193. While these patents are representative of the variety of load conveyor systems used in the past, they are by no means exclusive.

One of the disadvantages of the vertical conveyor systems which have heretofore been employed is that they do not provide load by-pass capability at each or preselected levels. As it will be seen from the ensuing description of the present invention, the provision of load by-pass capability for a lift conveyor enhances its usefulness and versatility since loads can be delivered to, or by-pass, any level at the control of the operator while maintaining a continuous operation.

It is therefore an object of this invention to provide a multi-level conveyor for moving loads from one level to another level.

It is also an object of this invention to provide a continuous multi-level load conveyor for moving loads from one level to another level with by-pass provision at the different levels.

It is further object of this invention to provide a continuous chain conveyor for moving loads from one level to another level wherein the conveyor system uncludes load by-pass assembly at each or preselected level.

The foregoing features and advantages of the present invention will be appreciated from the ensuing detailed description of the invention and the accompanying drawings.

SUMMARY OF THE INVENTION

The objects of the present invention are achieved by a multi-level lift conveyor provided with load by-pass stations which are selectively, and automatically, operable for either unloading the load at any level and conveying it away to a terminal, or for by-passing that floor and reloading it onto the lift conveyor for unloading to another floor. The conveyor system of this invention comprises a lift conveyor for lifting loads in a multi-level framework from one level to another. The lift conveyor includes a first and second pair of offset and spaced apart endless chains which are trained over corresponding sprockets. The sprockets are rotatably driven by a motor and serve to maintain the chain substantially parallel and spaced apart during their travel.

Connector units serving as load carriers in the form of a platform are connected between the chains. The load-carrying connectors or platforms are substantially horizontal during their travel between the levels but are bendable over the various sprockets.

Each level is provided with a roller conveyor and a lift table which, after the load is unloaded at that level, serves to either convey the load away to the desired terminal or re-load it back onto the lift conveyor thereby by-passing that level and lifting the load to another level. The lift table includes a hydraulic lift and a pivotably connected arm which can be automatically triggered by the hydraulic cylinder in order to raise or lower the lift table depending on whether or not the level is in a by-pass mode.

DESCRIPTION OF THE DRAWINGS

In the drawings, wherein like reference numerals designate like parts.

DETAILED DESCRIPTION OF THE INVENTION

Figure 1:
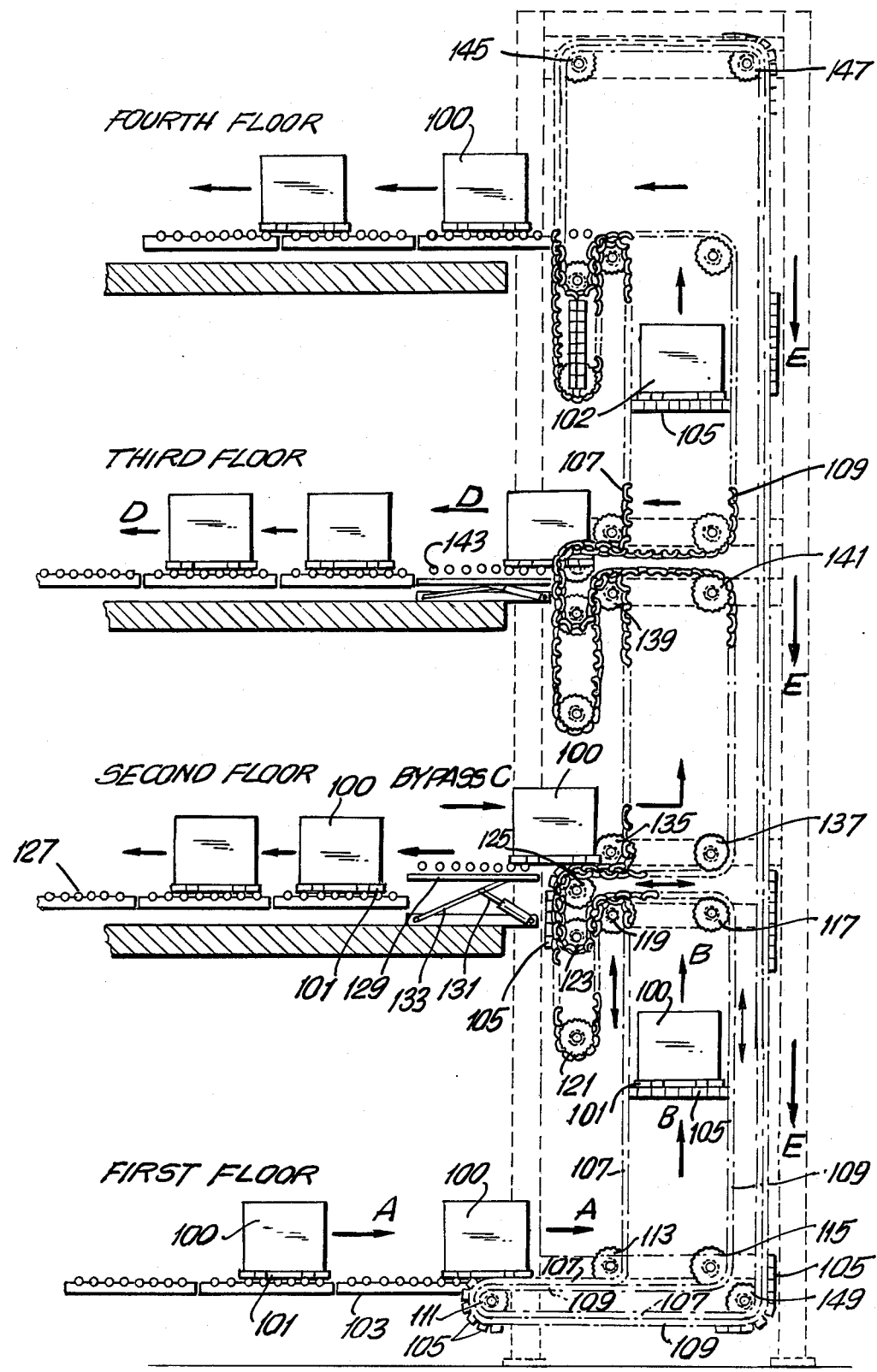
FIG. 1 is a schematic side elevational view of the multi-level load conveyor system of the present invention whereby a load is carried from the first floor and is discharged onto the third and fourth floors, with the second floor serving as a by-pass station.

Referring to the drawings, with particular reference first to FIG. 1, the conveyor system of the present invention generally comprises an offset pair of endless chains trained over a plurality of sprocket wheels (rollers) throughout their travel. Only the first pair of chains is shown in FIGS. 1-5 and the second pair of chains is arranged and spaced as the first pair of chains and travels in exactly the same manner but is separated from the first pair. The two pairs of chains are connected by connector units which span the distance between the two chains of each pair and serve to support the load in its travel as hereinafter described in more detail. The conveyor system of the present invention and its operation will now be described with reference to a 4-floor conveyor with the load being loaded on the first floor and unloaded on the third or fourth floor, the second floor serving as a load by-pass station. Of course, any floor may serve as the by-pass station, if desired, by triggering or activating the by-pass mechanism at that floor as will be explained below.

Figure 6:
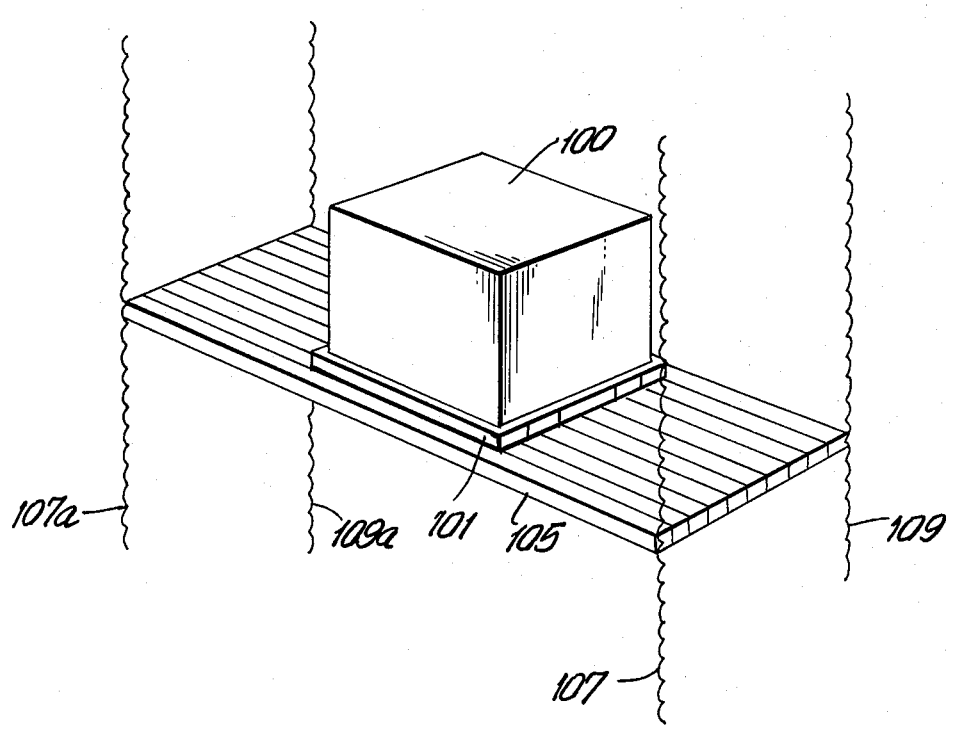
FIG. 6 is a perspective view showing a segment of two pairs of the offset chains of the conveyor shown in FIGS. 1-5, with a load-carrying connector supporting the load.

Thus, referring to FIG. 1, a load 100 such as a box or a carton is shown placed on a skid 101 which is advanced by a roller conveyor 103 in the direction of the arrow A. As the load 100 is advanced in this direction, it will be picked up by the flexible load carrying connector 105 which together with the pairs of offset chains 107 and 109 and the second pair of chains, travel over the sprocket wheel (roller) 111 which rotates in the same direction as the arrows A. In the drawings, while the offset chains are shown and designated as 107-109, as it was previously stated, in the views shown in FIGS. 1-5, only the front pair of the offset chains 107 and 109 are visible, there being a corresponding pair of offset chains 107a and 109a which are not seen in these views but shown in FIG. 6.

The load-carrying connectors are generally platforms which are substantially horizontal between levels but bendable over the sprockets during the chains movements. Such platforms are known in the art and described, for example, in U.S. Pat. No. 3,679,074, the disclosure of which is incorporated herein by reference. Similarly, there are corresponding sets of sprocket wheels at the rear of those sprocket wheels which are also not shown in the drawings for simplicity of illustration of the conveyor system. The pairs of offset chains 107 and 109 are trained over the sprocket wheels (rollers) 113 and 115, respectively, as they advance upward while the load 100 on the skid 101 is being supported during such upward travel by the flexible chain connector 105. As is more clearly shown in FIG. 6, the flexible connector chain 105 is generally a flexible platform adapted to travel over the sprocket wheels after disengagement of the load and skid from the connector. Thus, as the load is lifted in the direction of the upward travel of the offset chains 107 and 109 see arrow B), the chains will travel over the sprocket wheels 117 and 119 whereafter the chain 107 travels over and around the sprocket wheel 121, upwardly toward and over the sprocket wheel 123 where it joins the chain 109 and then over sprocket wheel 125. Simultaneously, chain 109 has travelled over and around the sprocket wheels 119, 123 and 125. Meanwhile, the load connector 105 has advanced to the position shown in FIG. 1 above sprocket wheel 125, ready to pick up the load 100 from the second floor by-pass station. When the load 100 is lifted to the second floor and reached the unloading position on the second floor, it is unloaded onto the lowered by-pass station, whereafter, the by-pass station is triggered to become operational, lifting the load to thereby cause the load to by-pass the second floor for unloading on the next higher floor.

Figure 2:
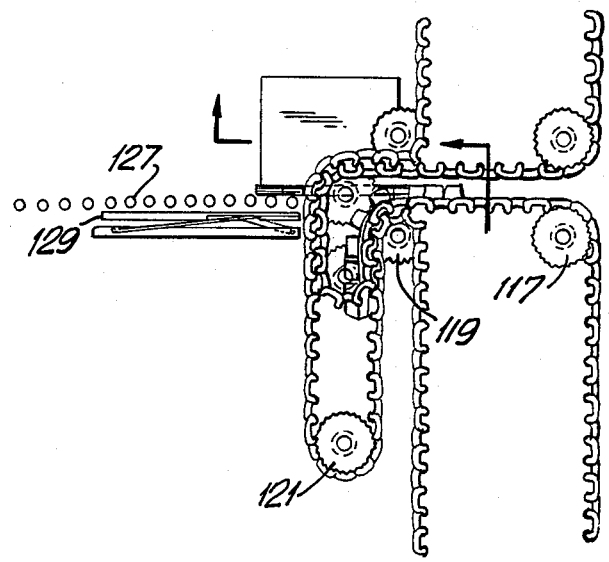
FIG. 2 is a schematic side elevational view showing the load at the point of discharge on the second floor of the multi-level load conveyor system of FIG. 1 before activating the load by-pass mechanism.
Figure 4:
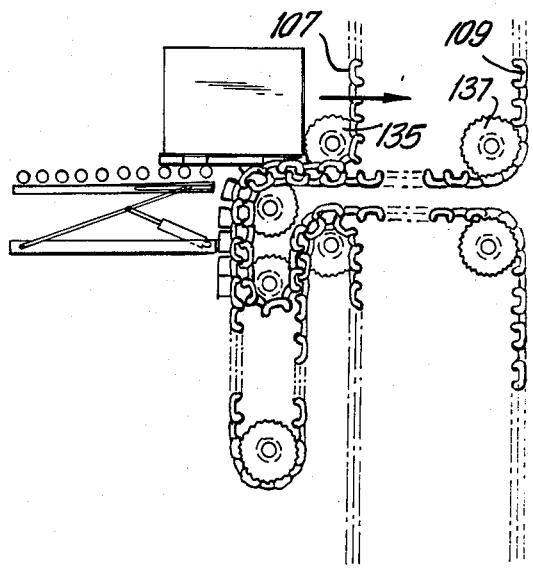
FIG. 4 is a view similar to FIGS. 1 and 2 illustrating how the load enters back into the multi-level conveyor after by-passing the second floor.
Figure 3:
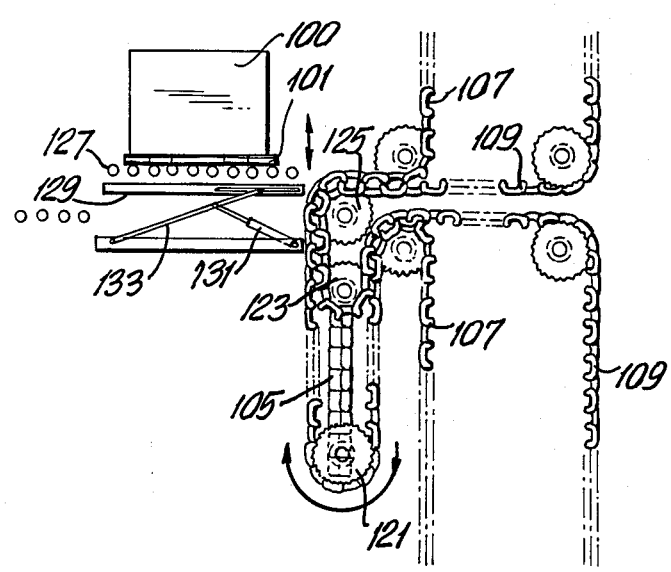
FIG. 3 is a view similar to FIG. 2 with the load discharged on the conveyor rollers and the load by-pass mechanism in activated position.
Figure 5:
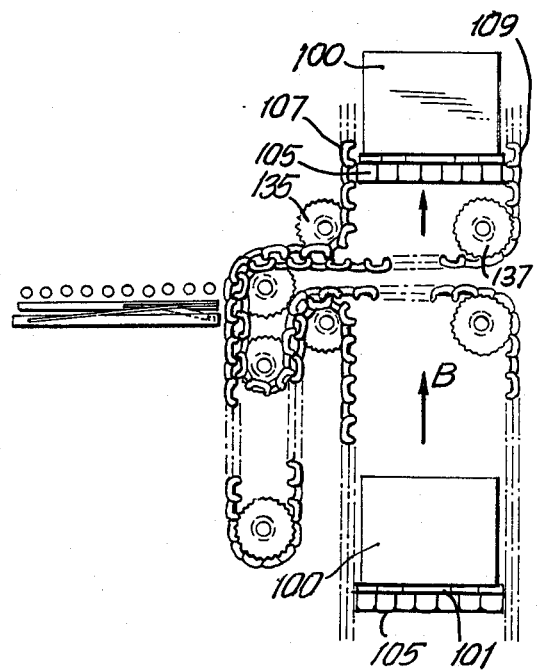
FIG. 5 is a view similar to FIGS. 1, 2 and 3 showing the load back in the multi-level conveyor and being carried to the next higher floor.

Thus, when the second floor is in the by-pass mode, the skid is unloaded onto a roller conveyor 127 which is supported by a lift table 129 when both the roller conveyor and the table are in the "down" position (see FIG. 2). The roller conveyor 127 consists of a plurality of rotatably driven or freely rotatable cylinders aligned in tandem and supported on parallel support members. The roller conveyor 127 is in the down position when the lift mechanism of the lift table 129 is in the down position. Thus, as shown in FIGS. 1 and 3, the lift table 129 is provided with a hydraulic cylinder 131 and a connecting arm 133. In the by-pass mode, the hydraulic cylinder 131 is activated (by a suitable means not shown) thereby raising the arm 133 and thus the lift table 129 to a level higher than the flexible load connector 105, which is now being carried between the pair of offset chains 107 and 109. With the roller conveyor 127 travelling in the direction of the by-pass arrow C, the load skid 101 carrying the load 100 will engage the flexible load connector 105 as is shown in FIG. 4. Once the load is fully on the load connector 105 and off the roller conveyor 127, the hydraulic cylinder 131 is deactivated to thereby retract the arm 133 and thus lower the table 129 to its initial level.

The load connector 105 now carrying the load 100 travels upward as before, with the chains 107 and 109 travelling over the sprocket wheels 135 and 137 and continue their upward travel, over the sprocket wheels 139 and 141 until the load reaches the third floor (see FIG. 1) where, in the illustrative description herein, it is in the unloading mode. As the chain 107 and 109 reach the third floor, the load connector 105 delivers the front of the skid 101 to the roller conveyor 143 which is of the same type and general construction as the roller conveyor 125 and which travels in the direction of the arrows D. A lift mechanism similar to that on the second floor is also provided on the third floor, however, the lift mechanism is in a retracted position so that the lift table is at the same level as the roller conveyors. In this mode, as the load is discharged onto the roller conveyor on the third floor, the load continues to advance in the direction of the arrows D to a storage terminal or some other facility (not shown).

If it is desired to lift the load for discharge onto the fourth floor, the lift mechanism on the third floor will be activated to become operational as a by-pass floor as in the case of the second floor. Thus, in accordance with the present invention, loads may be conveyed vertically from one level to several levels and, selectively by-pass any level by providing a conveyor system as herein described with load by-pass means stationed at any desired level.

After discharging the loads at the highest level (fourth floor in FIG. 1) depending on the number of levels in the conveyor system, the offset chains 107 and 109 are shown in FIG. 1 to travel over the sprocket wheels 145 and 147 and back, in the direction of the arrow E, toward the bottom sprocket wheel 149 and once again over the sprocket wheel 111 thereby completing the loop which defines the endless chain conveyor.

As it can be seen from the foregoing description, the conveyor system described herein can be used to discharge the load at each level. If the level is preselected to be a by-pass station, the load will be lifted for re-loading onto the conveyor. Thus, the by-pass consists of an unloading operation at a given level followed by a reloading operation at that level. For example, and once again referring to FIG. 1, a load which is placed on the conveyor on the first floor may be by-passed twice, once at the second floor and a second time on the third floor until it is finally unloaded on the fourth floor. This may be accomplished by providing a by-pass mechanism at each level and automatically triggering this by-pass to reload the load after it has been unloaded at that level.

The present invention therefore provides a lift conveyor with preselected by-pass stations uniquely suitable for multi-level loading and unloading operations. While the invention has been described with certain degree of particularity, it is apparent from the description herein that many changes and modifications may be made which are obvious to those skilled in the art. Such changes and modifications are nevertheless within the scope of this invention.

What is claimed is:

1. A lift conveyor for conveying loads from one level to another level in a multi-level framework, including at least one by-pass level, said lift conveyor comprising a first and second pair of offset and spaced-apart chains, said chains being trained over corresponding spaced-apart rotatable sprockets which guide and maintain said chains substantially parallel and spaced-apart during their travel; at least one load-carrying connector defining a horizontal platform between levels and being connected to said chains, said connector being bendable over said sprockets, a plurality of lift means with a lift means at each level for lifting the load, each lift means being disposed exteriorly of said lift conveyor, each of said lift means having a horizontal surface and means for raising or lowering said horizontal surface; a reversible conveyor means on said horizontal surface for receiving the load from lift conveyor and returning said load to said lift conveyor; lift control means for raising said horizontal surface after receiving the load and returning the load to the lift conveyor at the level at which said lift means is raised to form a by-pass, and lowering said horizontal surface after the load has by-passed said level.

2. A conveyor as in claim 1 wherein said horizontal surface is a table.

3. A conveyor as in claim 1 wherein said lift control means includes a hydraulic cylinder and a pivotable arm connected to said horizontal surface and adapted to be raised and retracted by said hydraulic cylinder.

4. A conveyor as in claim 3 wherein said horizontal surface is a table.

* * * * *